US011531546B2

(12) United States Patent
Schwarz et al.

(10) Patent No.: US 11,531,546 B2
(45) Date of Patent: Dec. 20, 2022

(54) HEXADECIMAL FLOATING POINT MULTIPLY AND ADD INSTRUCTION

(71) Applicant: INTERNATIONAL BUSINESS MACHINES CORPORATION, Armonk, NY (US)

(72) Inventors: Eric Mark Schwarz, Gardiner, NY (US); Stefan Payer, Stuttgart (DE); Petra Leber, Ehningen (DE); Kerstin Claudia Schelm, Stuttgart (DE); Michael Klein, Schoenaich (DE); Timothy Slegel, Staatsburg, NY (US); Reid Copeland, Richmond Hil (CA); Xin Guo, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/194,740

(22) Filed: Mar. 8, 2021

(65) Prior Publication Data

US 2022/0283818 A1    Sep. 8, 2022

(51) Int. Cl.
*G06F 9/38* (2018.01)
*G06F 9/30* (2018.01)
*G06F 9/345* (2018.01)

(52) U.S. Cl.
CPC .......... *G06F 9/3836* (2013.01); *G06F 9/3001* (2013.01); *G06F 9/30098* (2013.01); *G06F 9/345* (2013.01)

(58) Field of Classification Search
None
See application file for complete search history.

(56) References Cited

U.S. PATENT DOCUMENTS

| 5,957,997 A | 9/1999 | Olson et al. |
| 7,720,900 B2 | 5/2010 | Gerwig et al. |

(Continued)

FOREIGN PATENT DOCUMENTS

| EP | 2660715 A2 | 6/2013 |
| TW | 200709039 A | 3/2007 |

OTHER PUBLICATIONS

Aliyu, Farouq Muhammad, Design and Analysis of a Floating Point Fused Multiply Add Unit Using VHDL, International Journal of Engineering Trends and Technology, Jun. 2015, pp. 1-8 (+ cover sheet).

(Continued)

*Primary Examiner* — John M Lindlof
(74) *Attorney, Agent, or Firm* — Edward J. Wixted, III, Esq.; Blanche E. Schiller, Esq.; Heslin Rothenberg Farley & Mesiti P.C.

(57) ABSTRACT

An instruction to perform an operation selected from a plurality of operations configured for the instruction is executed. The executing includes determining a value of a selected operand of the instruction. The determining the value is based on a control of the instruction and includes reading the selected operand of the instruction from a selected operand location to obtain the value of the selected operand, based on the control having a first value, and using a predetermined value as the value of the selected operand, based on the control having a second value. The value and another selected operand of the instruction are multiplied to obtain a product. An arithmetic operation is performed using the product and a chosen operand of the instruction to obtain an intermediate result. A result from the intermediate result is obtained and placed in a selected location.

25 Claims, 13 Drawing Sheets

(56) References Cited

U.S. PATENT DOCUMENTS

| | | | |
|---|---|---|---|
| 7,730,117 | B2 | 6/2010 | Fleischer et al. |
| 9,720,648 | B2 | 8/2017 | Mueller et al. |
| 9,778,909 | B2 | 10/2017 | Samudrala et al. |
| 10,782,967 | B2 | 9/2020 | Schwarz et al. |
| 2002/0062436 | A1 | 5/2002 | Van Hook et al. |
| 2003/0067473 | A1* | 4/2003 | Taylor .................. G06F 9/3017 345/530 |
| 2004/0230774 | A1 | 11/2004 | Schwarz |
| 2004/0260914 | A1* | 12/2004 | Gee ..................... G06F 9/30014 712/E9.019 |
| 2010/0023573 | A1* | 1/2010 | Boersma ............. G06F 7/49947 708/495 |
| 2012/0011181 | A1 | 1/2012 | Samy et al. |
| 2013/0290685 | A1 | 10/2013 | Corbal San Adrian et al. |
| 2014/0244704 | A1 | 8/2014 | Dao Trong et al. |
| 2019/0079762 | A1 | 3/2019 | Heinecke et al. |
| 2020/0057636 | A1 | 2/2020 | Engh-Halstvedt |
| 2020/0310756 | A1 | 10/2020 | Rubanovich et al. |
| 2020/0348908 | A1 | 11/2020 | Schelm et al. |

OTHER PUBLICATIONS

Duale, A.Y. et al., "Decimal Floating-Point in z9: An Implementation And Testing Perspective," IBM J. Res & Dev., vol. 41, No. 1/2, Jan./Mar. 2007, pp. 217-227.

Huang, Libo et al., "A New Architecture For Multiple-Precision Floating-Point Multiply-Add Fused Unit Design," 18th IEEE Symposium on Computer Arithmetic, Jun. 2007, pp. 1-8.

IBM, "z/Architecture—Principles of Operation," IBM Publication No. SA22-7832-12, Thirteenth Edition, Sep. 2019, pp. 1-2000.

Manolopoulos, K. et al., "An Efficient Multiple Precision Floating-Point Multiply-Add Fused Unit," Oct. 2015, pp. 1-22.

Mell, Peter and Tim Grance, "The NIST Definition of Cloud Computing," National Institute of Standards and Technology, Information Technology Laboratory, Special Publication 800-145, Sep. 2011, pp. 1-7.

Payer, Stefan et al., "SIMD Multi Format Floating-Point Unit on the IBM z15(TM)," 2020 IEEE 27th Symposium on Computer Arithmetic, Jun. 2020, pp. 1-4.

Notification of Transmittal of the International Search Report and the Written Opinion of the International Searching Authority, PCT/EP2022/055078, dated Jun. 15, 2022, (11 pages).

* cited by examiner

EXECUTING AN INSTRUCTION TO PERFORM AN OPERATION SELECTED FROM A PLURALITY OF OPERATIONS CONFIGURED FOR THE INSTRUCTION ～500

THE EXECUTING THE INSTRUCTION INCLUDING

DETERMINING A VALUE OF A SELECTED OPERAND OF THE INSTRUCTION ～502

THE DETERMINING THE VALUE IS BASED ON A CONTROL OF THE INSTRUCTION AND INCLUDES ～504

READING THE SELECTED OPERAND OF THE INSTRUCTION FROM A SELECTED OPERAND LOCATION TO OBTAIN THE VALUE OF THE SELECTED OPERAND, BASED ON THE CONTROL OF THE INSTRUCTION HAVING A FIRST VALUE ～506

USING A PREDETERMINED VALUE AS THE VALUE OF THE SELECTED OPERAND, BASED ON THE CONTROL OF THE INSTRUCTION HAVING A SECOND VALUE ～508

MULTIPLYING THE VALUE AND ANOTHER SELECTED OPERAND OF THE INSTRUCTION TO OBTAIN A PRODUCT ～510

PERFORMING AN ARITHMETIC OPERATION USING THE PRODUCT AND A CHOSEN OPERAND OF THE INSTRUCTION TO OBTAIN AN INTERMEDIATE RESULT ～512

OBTAINING A RESULT FROM THE INTERMEDIATE RESULT ～514

PLACING THE RESULT IN A SELECTED LOCATION ～516

THE USING THE PREDETERMINED VALUE AS THE VALUE OF THE SELECTED OPERAND INCLUDES USING THE PREDETERMINED VALUE ABSENT READING THE SELECTED OPERAND FROM THE SELECTED OPERAND LOCATION (e.g., AT LEAST ONE REGISTER) ～518

FIG. 5A

THE PREDETERMINED VALUE INCLUDES A VALUE OF ONE ~520

THE EXECUTING THE INSTRUCTION FURTHER INCLUDES ~522

DETERMINING WHETHER A ROUNDING OPERATION IS TO BE PERFORMED

PERFORMING THE ROUNDING OPERATION ON A VERSION OF THE ~524
  INTERMEDIATE RESULT TO OBTAIN THE RESULT, BASED ON
  DETERMINING THAT THE ROUNDING OPERATION IS TO BE PERFORMED

THE VERSION OF THE INTERMEDIATE RESULT INCLUDES A NORMALIZED RESULT ~526

THE DETERMINING WHETHER THE ROUNDING OPERATION IS TO BE PERFORMED
INCLUDES CHECKING A ROUNDING MODE CONTROL OF THE INSTRUCTION ~528

BASED ON THE ROUNDING MODE CONTROL BEING EQUAL TO ONE VALUE, THE
ROUNDING OPERATION IS TO BE PERFORMED ~530

THE OBTAINING THE RESULT INCLUDES ~532

NORMALIZING THE INTERMEDIATE RESULT TO OBTAIN A NORMALIZED
  RESULT

USING THE NORMALIZED RESULT TO OBTAIN THE RESULT ~534

FIG. 5B

THE USING THE NORMALIZED RESULT INCLUDES

DETERMINING WHETHER A ROUNDING OPERATION IS TO BE PERFORMED ⏋

ROUNDING THE NORMALIZED RESULT, BASED ON DETERMINING THAT   540
    THE ROUNDING OPERATION IS TO BE PERFORMED, TO OBTAIN THE
    RESULT ~542

TRUNCATING THE NORMALIZED RESULT, BASED ON DETERMINING THAT
    THE ROUNDING OPERATION IS NOT TO BE PERFORMED, TO OBTAIN THE
    RESULT ~544

THE SELECTED LOCATION INCLUDES AT LEAST ONE REGISTER SPECIFIED BY AT LEAST ONE FIELD OF THE INSTRUCTION ~546

THE CONTROL IS AN ADD ONLY CONTROL, THE ARITHMETIC OPERATION INCLUDES AN ADD OPERATION ~548

BASED ON THE CONTROL HAVING THE SECOND VALUE, THE CONTROL INDICATES THAT THE INSTRUCTION IS TO PERFORM AN ADD ONLY OPERATION IN THAT THE OTHER SELECTED OPERAND IS MULTIPLIED BY THE PREDETERMINED VALUE OF ONE ~550

BASED ON THE CONTROL HAVING THE FIRST VALUE, THE CONTROL INDICATES THAT THE INSTRUCTION IS TO PERFORM A MULTIPLY AND ADD OPERATION AND THAT THE OTHER SELECTED OPERAND IS MULTIPLIED BY THE VALUE READ FROM THE SELECTED OPERAND LOCATION ~552

FIG. 5C

HEXADECIMAL FLOATING POINT MULTIPLY AND ADD INSTRUCTION

BACKGROUND

One or more aspects relate, in general, to facilitating processing within a computing environment, and in particular, to improving such processing.

Applications executing within a computing environment provide many operations used by numerous types of technologies, including but not limited to, engineering, manufacturing, medical technologies, automotive technologies, computer processing, etc. These applications, written in a programming language, such as COBOL, often perform complex calculations in performing the operations. The calculations include, for instance, exponentiation functions, which often require conversion of data from binary coded decimal to hexadecimal floating point, performing the function in hexadecimal floating point, and converting the result back to binary coded decimal.

The performing the function in hexadecimal floating point includes hexadecimal floating point arithmetic. However, the arithmetic is not accurate enough, and therefore, additional instructions are performed to obtain greater accuracy. This results in increasing complexity, reducing system performance and increasing use of system resources.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes executing an instruction to perform an operation selected from a plurality of operations configured for the instruction. In one example, the executing the instruction includes determining a value of a selected operand of the instruction. The determining the value is based on a control of the instruction and includes, for instance, reading the selected operand of the instruction from a selected operand location to obtain the value of the selected operand, based on the control of the instruction having a first value, and using a predetermined value as the value of the selected operand, based on the control of the instruction having a second value. The value and another selected operand of the instruction are multiplied to obtain a product. An arithmetic operation is performed using the product and a chosen operand of the instruction to obtain an intermediate result. A result is obtained from the intermediate result and placed in a selected location.

By using a single instruction to perform the multiplying and arithmetic operations, performance is improved and utilization of resources is reduced. By using a single architected instruction to perform the multiplying and arithmetic operations, certain tasks may be performed, such as the multiplying and arithmetic operations, much more efficiently than using a software paradigm. The multiplying and/or arithmetic operations are performed much faster, reducing execution time, and improving processor and/or overall system performance.

By using a single instruction configured to perform multiple operations, performance is improved and utilization of resources is reduced. By using a single architected instruction configured to perform a multiply and arithmetic operation or an arithmetic only operation in which the multiplication is performed to provide greater accuracy for the arithmetic operation, certain tasks may be performed, such as the multiply and arithmetic operations, much more efficiently than using a software paradigm. The multiply and arithmetic operations are performed much faster, reducing execution time, and improving processor and/or overall system performance.

Further, in one example, by performing the arithmetic (e.g., addition) using a multiply instruction which also performs the arithmetic, accuracy is increased, and by using a single instruction rather than multiple instructions, complexity is reduced, performance is improved, and the use of system resources is reduced. For instance, multiplication of two operands results in a product of twice the width and by combining arithmetic operations in a single instruction, the full double width product can participate in the arithmetic rather than a rounded or truncated product. As an example, the multiplication of two 6 hex digit operands results in a 12 hex digit product. If they were separate operations, the product would be truncated to 6 hex digits prior to the next operation. By using the full intermediate result, the combined operation is more accurate. Stated another way, for floating point simple operations with truncation, typically a 0 to 1 unit of last place (ulp) of error is obtained. If there is a multiply and truncate, the product has a 1 ulp of error, and then if there is an add of the product to an addend, that results in another 1 ulp of error for a total of 2 ulps of error. However, if it is one compound operation, there is only 1 ulp of error. This is true for binary floating point and for hexadecimal floating point, it is even worse.

In one example, the using the predetermined value as the value of the selected operand includes using the predetermined value absent reading the selected operand from the selected operand location. The selected operand location is, for instance, at least one register. This improves system performance by eliminating a read of, e.g., one or more registers.

As an example, the predetermined value includes a value of one.

In one example, the executing the instruction further includes determining whether a rounding operation is to be performed and based on determining that the rounding operation is to be performed, performing the rounding operation on a version of the intermediate result to obtain the result. The version of the intermediate result includes, for instance, a normalized result.

By using a single instruction to perform the multiplying, arithmetic and/or rounding operations, performance is improved, and utilization of resources is reduced. By using a single architected instruction to perform the multiplying, arithmetic and/or rounding operations, certain tasks may be performed, such as the multiplying, arithmetic and/or rounding operations, much more efficiently than using a software paradigm. The multiplying, arithmetic and/or rounding operations are performed much faster, reducing execution time, and improving processor and/or overall system performance. Further, rounding drops the absolute error to ½ ulp in both directions. Non-fused multiply-add has double rounding errors, whereas fused multiply-add has a single rounding error.

In one example, the determining whether the rounding operation is to be performed includes checking a rounding mode control of the instruction and based on the rounding mode control being equal to one value, the rounding operation is to be performed. By including a rounding mode control as part of the single instruction, direction and magnitude of an error may be controlled.

In one example, the obtaining the result includes normalizing the intermediate result to obtain a normalized result and using the normalized result to obtain the result. Further, the using the normalized result to obtain the result includes, for instance, determining whether a rounding operation is to be performed and based on determining that the rounding operation is to be performed, rounding the normalized result to obtain the result. Further, in one example, based on determining that the rounding operation is not to be performed, truncating the normalized result to obtain the result.

By using a single instruction to perform the multiplying, arithmetic, normalizing, rounding and/or truncating operations, performance is improved, and utilization of resources is reduced. By using a single architected instruction to perform the multiplying, arithmetic, normalizing, rounding and/or truncating operations, certain tasks may be performed, such as the multiplying, arithmetic, normalizing, rounding and/or truncating operations, much more efficiently than using a software paradigm. The multiplying, arithmetic, normalizing, rounding and/or truncating operations are performed much faster, reducing execution time, and improving processor and/or overall system performance.

As an example, the selected location includes at least one register specified by at least one field of the instruction.

In one example, the control is an add only control and the arithmetic operation includes an add operation. Based on the control having the second value, the control indicates that the instruction is to perform an add only operation in that the other selected operand is multiplied by the predetermined value of one. Further, based on the control having the first value, the control indicates that the instruction is to perform a multiply and add operation and that the other selected operand is multiplied by the value read from the selected operand location.

By using a single instruction configured to perform multiple operations, performance is improved, and utilization of resources is reduced. By using a single architected instruction configured to perform a multiply and add operation or an add only operation in which the multiplication is performed to provide greater accuracy for the add operation but otherwise does not affect the summation, certain tasks may be performed, such as the multiply and add operations, much more efficiently than using a software paradigm. The multiply and add operations are performed much faster, reducing execution time, and improving processor and/or overall system performance.

Further, in one example, by performing the addition using a multiply instruction which also performs the addition, accuracy is increased, and by using a single instruction rather than multiple instructions, complexity is reduced, performance is improved, and the use of system resources is reduced.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 5A-5C depict one example of facilitating processing within a computing environment, in accordance with one or more aspects of the present invention;

DETAILED DESCRIPTION

Figure 1A:
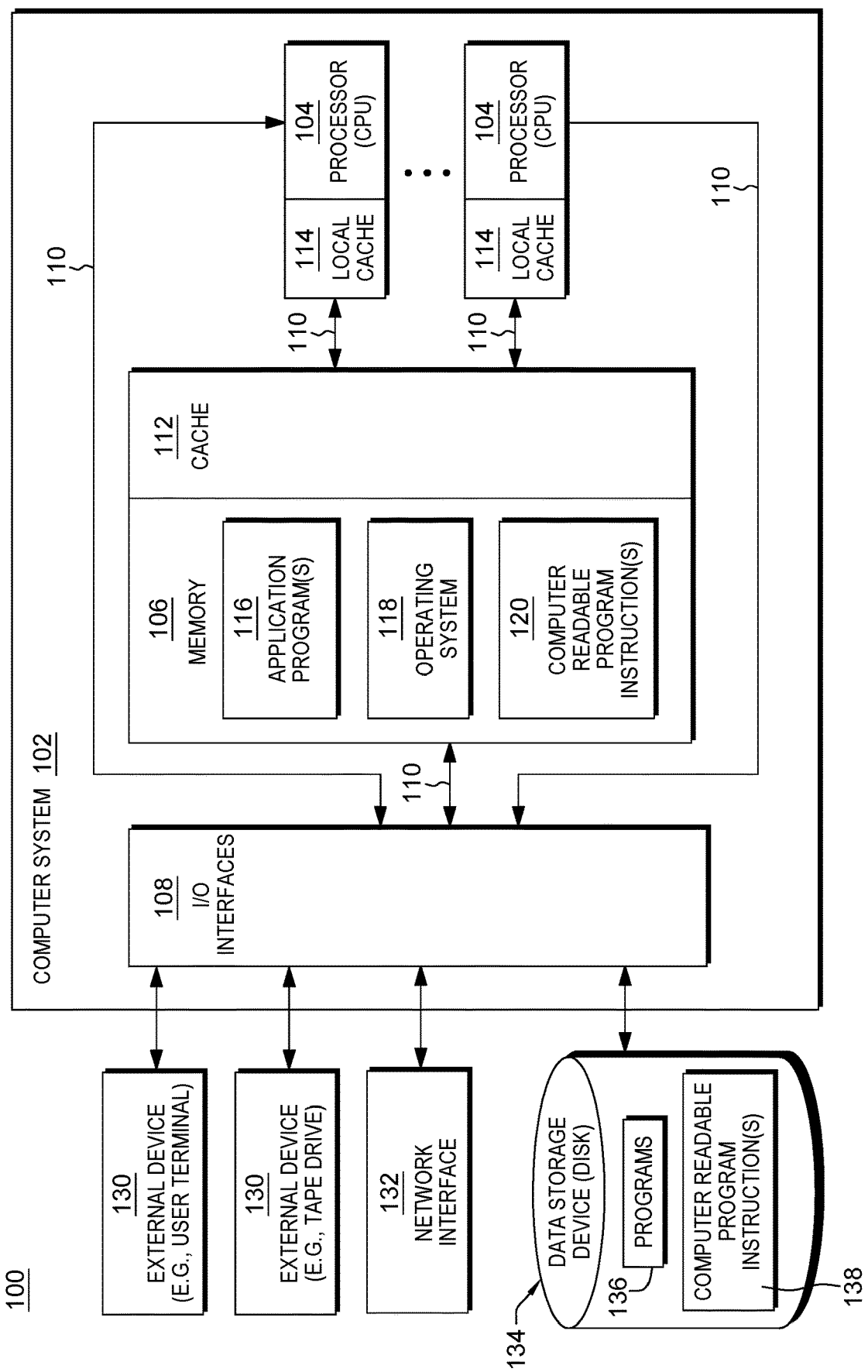
FIG. 1A depicts one example of a computing environment to incorporate and use one or more aspects of the present invention.

In accordance with an aspect of the present invention, a capability is provided to facilitate processing within a computing environment. As one example, a single instruction (e.g., a single architected hardware machine instruction at the hardware/software interface) is provided that is configured to perform multiple operations, including, e.g., a multiply and arithmetic (e.g., add) operation and an operation referred to herein as an arithmetic only (e.g., Add Only) operation. The instruction, referred to herein as a Multiply and Add instruction, is part of a general-purpose processor instruction set architecture (ISA), which is dispatched by a program on a processor, such as a general-purpose processor. (In another example, the instruction may be part of a special-purpose processor, such as a co-processor configured for certain functions.)

As part of execution of the single instruction (e.g., a Multiply and Add instruction), various operations may be performed including multiplying, adding, normalizing, rounding and/or truncating. Each of these operations is performed as part of executing the single instruction, improving system performance, and reducing use of system resources.

Further, in accordance with an aspect of the present invention, the single instruction, which is capable of performing a multiply and arithmetic operation, such as a multiply and add operation, is also able to perform an arithmetic only operation, such as an Add Only operation. As used herein, arithmetic or Add Only indicates that while a multiplication is performed, the multiplier is one (e.g., in hexadecimal floating point format) and performed to provide greater accuracy for the arithmetic, such as the add, but otherwise does not affect the arithmetic, e.g., the adding of the values. The multiplier in the Add Only operation does not have to be read from the register file, there is less dependency on registers, and a register does not have to hold the constant 1.0.

Yet further, in one aspect, the single instruction includes a rounding mode specifier that can select between a truncated result or a round nearest with ties away from zero. This controls the direction and amount of rounding error.

In one example, the operands of the instruction are in a hexadecimal floating point format, which is a format for encoding floating point numbers. In one example, a hexadecimal floating point number includes a sign bit, a characteristic (e.g., 7 bits) and a fraction (e.g., 6, 14 or 28 digits). The characteristic represents a signed exponent and is obtained by adding, e.g., 64 to the exponent value. The range of the characteristic is 0 to 127, which corresponds to an exponent range of, e.g., −64 to +63. The magnitude of a hexadecimal floating point number is the product of its fraction and the number 16 raised to the power of the exponent that is represented by its characteristic. The number is positive or negative depending on whether the sign bit is, e.g., zero or one, respectively.

A hexadecimal floating point number may be represented in a number of different formats, including a short format (e.g., 32-bit), a long format (e.g., 64-bit) and an extended format (e.g., 128-bit). In each format, the first bit (e.g., the first leftmost bit, bit 0) is the sign bit; the next selected number of bits (e.g., seven bits) are the characteristic, and in the short and long formats, the remaining bits are the fraction, which include, e.g., six or fourteen hexadecimal digits, respectively. In the extended format, the fraction is, e.g., a 28-digit fraction, and the extended hexadecimal floating point number consists of two long format numbers that are called the high-order and the low-order parts. The high-order part is any long hexadecimal floating point number. The fraction of the high-order part contains, e.g., the leftmost 14 hexadecimal digits of the 28-digit fraction, and the fraction of the low-order part contains, e.g., the rightmost 14 hexadecimal digits of the 28-digit fraction. The characteristic and sign of the high-order part are the characteristic and sign of the extended hexadecimal floating point number, and the sign and characteristic of the low-order part of an extended operand are ignored.

One embodiment of a computing environment to incorporate and use one or more aspects of the present invention is described with reference to FIG. 1A. As an example, the computing environment is based on the z/Architecture® hardware architecture, offered by International Business Machines Corporation, Armonk, N.Y. One embodiment of the z/Architecture hardware architecture is described in a publication entitled, "z/Architecture Principles of Operation," IBM Publication No. SA22-7832-12, Thirteenth Edition, September 2019, which is hereby incorporated herein by reference in its entirety. The z/Architecture hardware architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of processors 104. Further, memory 106 may include one or more programs or applications 116 and at least one operating system 118. An example operating system includes a z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities may also be used. Memory 106 may also include one or more computer readable program instructions 120, which may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
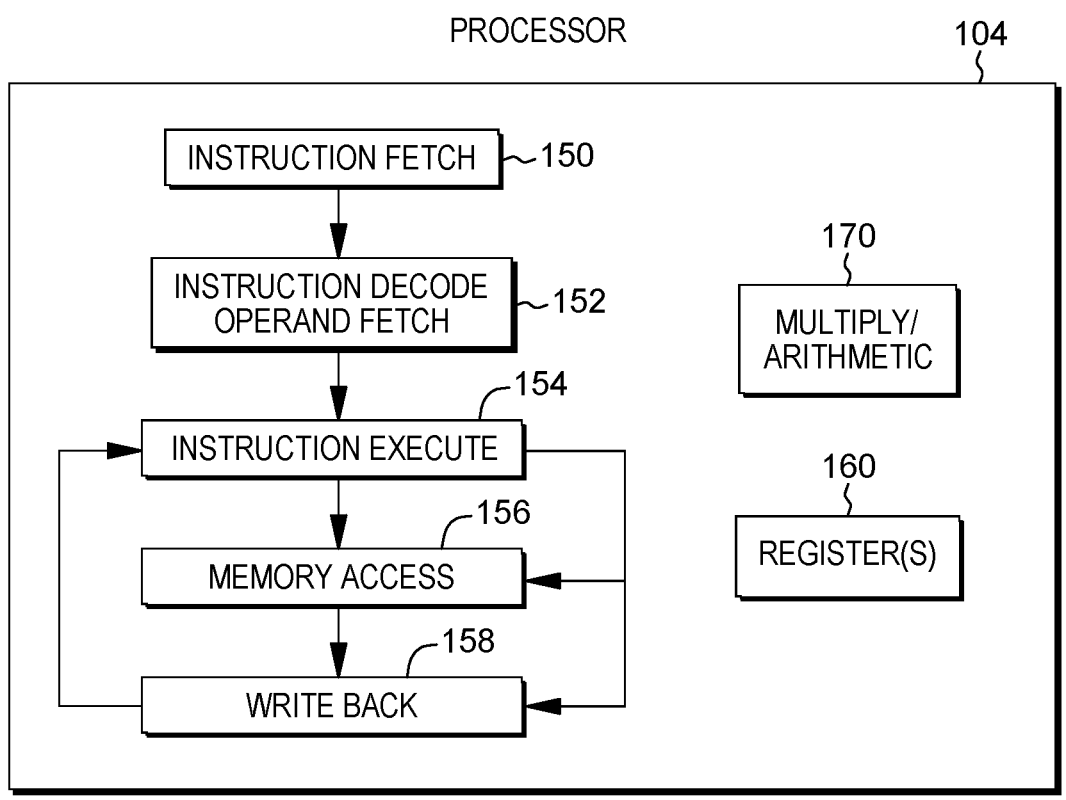
FIG. 1B depicts further details of a processor of FIG. 1A, in accordance with one or more aspects of the present invention.

In one example, a processor (e.g., processor 104) includes a plurality of functional components used to execute instructions. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing. Further, one or more of the components may, in accordance with one or more aspects of the present invention, include at least a portion of or have access to one or more other components used in performing multiplying and arithmetic (e.g., add) and/or arithmetic only operations of, e.g., a Multiply and Add instruction (or other processing that may use one or more aspects of the present invention), as described herein. The one or more other components include, for instance, a multiply/arithmetic component (or one or more other components) 170.

In accordance with an aspect of the present invention, an instruction, referred to herein as a Multiply and Add instruction, is provided to perform, as part of executing the one instruction, at least, multiplying, adding, normalizing, rounding and/or truncating operations. The instruction is configured to perform multiple operations, including, e.g., a Multiply and Add operation and an Add Only operation in which the multiplication (e.g., by 1) is performed to provide accuracy in the product which is employed in the adding.

For instance, multiplication of two operands results in a product of twice the width and by combining arithmetic operations in a single instruction, the full double width product can participate in the arithmetic rather than a rounded or truncated product. As an example, the multiplication of two 6 hex digit operands results in a 12 hex digit product. If they were separate operations, the product would be truncated to 6 hex digits prior to the next operation. By using the full intermediate result, the combined operation is more accurate. Stated another way, for floating point simple operations with truncation, typically a 0 to 1 unit of last place (ulp) of error is obtained. If there is a multiply and truncate, the product has a 1 ulp of error, and then if there is an add of the product to an addend, that results in another 1 ulp of error for a total of 2 ulps of error. However, if it is one compound operation, there is only 1 ulp of error. This is true for binary floating point and for hexadecimal floating point, it is even worse.

As an example, hexadecimal floating point addition is defined to align the fractions using the exponents and maintain 1 guard digit. If the operand with the bigger exponent has leading zeros, 1 guard digit is not sufficient to get an accurate result. A hexadecimal floating point multiply and add operation is defined to keep the intermediate result exactly, prior to rounding. Using a hexadecimal floating point multiply-add operation with the multiplicand equal to 1 creates a more accurate addition.

For instance:
A=0.000123x*16^(8)
B=0.987654x*16^(2)
HFP Add
0.000123x*16^8
0.0000009x*16^8 only 1 guard digit
0.0001239x*16^8 interm result
0.123900x*16^5 normalized result
HFP multiply-add
0.000123x*1^8
0.000000987654x*1^8
0.000123987654x*1^8 interm result
0.123987654x*1^5 normalized
0.123987x*1^5 result The worst case example of hexadecimal floating point Add is when a zero with a big exponent is added to a number and all precision is lost. For instance:
A=0.000000x*1^63
B=0.ABCDEFx*1^56
0.000000x*1^63 A
0.0000000x*1^63 B aligned with 1 guard digit
0.0000000x*1^63 interm result
0.000000x*1^0 result which is a true zero
Result is off by about 16^56 and has no digits of precision.
If this is done with hexadecimal floating point Multiply-Add, the result is equal to B and is exact.

Figure 2A:
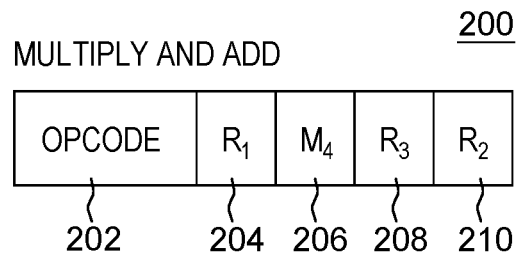
FIG. 2A depicts one example of a format of a Multiply and Add instruction, in accordance with one or more aspects of the present invention.

One embodiment of a Multiply and Add instruction used to perform a Multiply and Add operation and/or an Add Only operation is described with reference to FIG. 2A. The instruction is executed, in one example, using a general-purpose processor (e.g., processor 104). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

In one example, the Multiply and Add instruction has a RRD format that denotes a register and register operation with an extended operation code (opcode) and an additional register. As shown in FIG. 2A, in one example, a Multiply and Add instruction 200 has a plurality of fields, and a field may have a subscript number associated therewith. The subscript number associated with a field of the instruction denotes the operand to which the field applies. For instance, the subscript number 1 associated with register $R_1$ denotes that the register specified using $R_1$ includes the first operand, and so forth. A register operand is one register in length, which is, for instance, 64 bits.

In one embodiment, Multiply and Add instruction 200 includes operation code (opcode) field 202 (e.g., bits 0-15) indicating, at least, a multiply and add operation; a first register ($R_1$) field 204 (e.g., bits 16-19) used to designate at least one first register; a mask ($M_4$) field 206 (e.g., bits 20-23); a second register ($R_2$) field 210 (e.g., bits 28-31) used to designate at least one second register; and a third register ($R_3$) field 208 (e.g., bits 24-27) used to designate at least one third register, each of which is described below. In one embodiment, the fields are separate and independent from one another; however, in other embodiments, more than one field may be combined. Further information regarding these fields is described below.

In one embodiment, register ($R_1$) field 204 is used to indicate at least one register that includes a first operand, which is a value to be added in execution of the instruction, and the first operand location (e.g., at least $R_1$) is to store a result of execution of the instruction. The second operand is contained in at least one register specified using register ($R_2$) field 210 and is, for instance, a hexadecimal floating point number, and the third operand is contained in at least one register specified using register ($R_3$) field 208 and is, for instance, a hexadecimal floating point number.

Figure 2B:
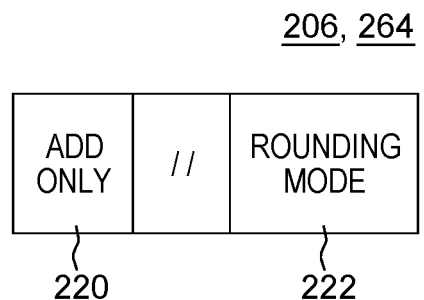
FIG. 2B depicts one example of further details of a mask field of the Multiply and Add instruction, in accordance with one or more aspects of the present invention.

In one example, one or more controls are used in executing the instruction. Example controls are included in $M_4$ field 206. Referring to FIG. 2B, $M_4$ field 206 includes:

Add Only 220: When this control (e.g., bit 0) is zero, the function performed is Multiply and Add. When this control is one, the function performed is Add Only, in which the multiply and add are performed and the third operand is assumed to be 1.0. This operation is equivalent to an addition with infinite guard digits followed by normalization and rounding, and the rounding mode is determined by the rounding mode control, described below.

Rounding Mode 222: When this control (e.g., bit 3) is zero, the normalized intermediate result is truncated to form the result. When this control is one, the normalized intermediate result is rounded to nearest with ties away from zero. A normalized intermediate result includes 29, 15 or 7 most significant hexadecimal digits of the multiply and add result for extended, long and short formats, respectively, which includes one guard digit on the right. A one is added to the leftmost bit of the guard digit of the intermediate result, any carry is propagated to the left, and the guard digit is dropped to produce the result fraction. When the intermediate result of rounding causes the fraction to overflow, the fraction is shifted right by one hexadecimal digit position, and the characteristic is incremented.

In one example, bits 1-2 are ignored and should contain zeros.

Figure 2C:
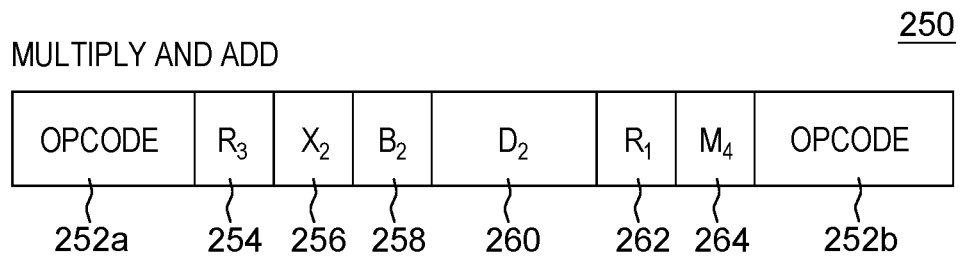
FIG. 2C depicts another example of a format of the Multiply and Add instruction, in accordance with one or more aspects of the present invention.

Another example of a format of a Multiply and Add instruction is described with reference to FIG. 2C. In one embodiment, a Multiply and Add instruction 250 has a RXF format that denotes a register and indexed storage operation, an extended opcode field and an additional register field. It includes, for instance, operation code (opcode) fields 252a, 252b (e.g., bits 0-7 and bits 40-47) indicating, at least, a multiply and add operation; a first register ($R_1$) field 262 (e.g., bits 32-35) used to designate at least one first register; a mask ($M_4$) field 264 (e.g., bits 36-39); a third register ($R_3$) field 254 (e.g., bits 8-11) used to designate at least one third register; and a plurality of fields, such as an index ($X_2$) field 256 (e.g., bits 12-15), a base ($B_2$) field 258 (e.g., bits 16-19) and a displacement ($D_2$) field 260 (e.g., bits 20-31), used to designate an address of a second operand. For instance, the contents of the general registers designated by the $X_2$ and $B_2$ fields are added to the contents of the $D_2$ field to form an address of the second operand. Each of the fields is described below. In one embodiment, the fields are separate and independent from one another; however, in other embodiments, more than one field may be combined.

As described herein, in one embodiment, register ($R_1$) field 262 is used to indicate at least one register that includes a first operand, which is a value to be added in execution of the instruction, and the first operand location is to store a result of execution of the instruction. The second operand obtained from the address defined using $X_2$ field 256, $B_2$ field 258 and $D_2$ field 260, as described above, is, for instance, a hexadecimal floating point number, and the third operand is contained in at least one register specified using register ($R_3$) field 254 and is, for instance, a hexadecimal floating point number.

In one example, one or more controls are used in one embodiment in executing the instruction. Example controls are included in $M_4$ field 264 and are described above with reference to FIG. 2B.

In execution of one embodiment of the Multiply and Add instruction (200, 250), the third operand (e.g., obtained as described below) is multiplied by the second operand (e.g., obtained using the $R_2$ register or from the second operand address) to obtain a product (also referred to herein as an intermediate product), and then the first operand (e.g., obtained using the $R_1$ register) is added to the product. In one embodiment, for an Add Only operation, if the $M_4$ field 206, 264 bit 0 (Add Only 220) is, e.g., a one, the operation is addition of the second operand to the first operand. The value from the third operand floating point register(s) is ignored (e.g., it is not read from the register(s) and assumed to be a predetermined value, such as 1). The sum is placed at the first operand location.

The Multiply and Add operation may be summarized as:

$$Op_1 = op_3 \times op_2 + op_1$$

The third and second hexadecimal floating point operands are multiplied, forming an intermediate product, and the first operand is then added algebraically to the intermediate product, forming an intermediate result. The exponent and fraction of the intermediate product and intermediate result are maintained exactly. The intermediate result, if non-zero, is normalized and truncated to the operand format and then placed at the first operand location. In one example, for the Add Only operation, if the $M_4$ field 206, 264 bit 3 (Rounding Mode 222) is one, the intermediate result is normalized and rounded to nearest with ties away from zero to the operand format and then placed at the first operand location.

The sign of the result is determined by the rules of algebra, unless the intermediate result fraction is zero, in which case the result is made a positive true zero.

A hexadecimal floating point exponent overflow exception exists when the characteristic of the normalized result would exceed 127 and the fraction is not zero. The operation is completed by making the result characteristic 128 less than the correct value, and a program interruption for hexadecimal floating point exponent overflow occurs. The result is normalized, and the sign and fraction remain correct.

The hexadecimal floating point exponent overflow is not recognized on intermediate values, provided the normalized result can be represented with the correct characteristic.

A hexadecimal floating point underflow exception exists when the characteristic of the normalized result would be less than zero and the fraction is not zero. If the hexadecimal floating point exponent underflow mask bit in a control register, such as a program status word, is one, the operation is completed by making the result characteristic 128 greater than the correct value, and a program interruption for hexadecimal floating point exponent underflow occurs. The result is normalized, and the sign and fraction remain correct. If the hexadecimal floating point exponent underflow mask bit in the control register is zero, a program interruption does not occur; instead, the operation is completed by making the result a positive true zero.

A hexadecimal floating point exponent underflow is not recognized on input operands and intermediate values, provided the normalized result can be represented with the correct characteristic.

Further details of one embodiment of processing based on execution of a Multiply and Add instruction, in accordance with one or more aspects of the present invention, are described with reference to FIGS. 3-4. In one example, a processor, such as a general processor 104, is used to execute the instruction. As an example, hardware of the processor is used to execute the instruction. The hardware may be within the processor or coupled thereto for purposes of receiving the instruction from the processor, which, e.g., obtains, decodes and sets-up the instruction to execute on the hardware. Other variations are possible.

Figure 3:
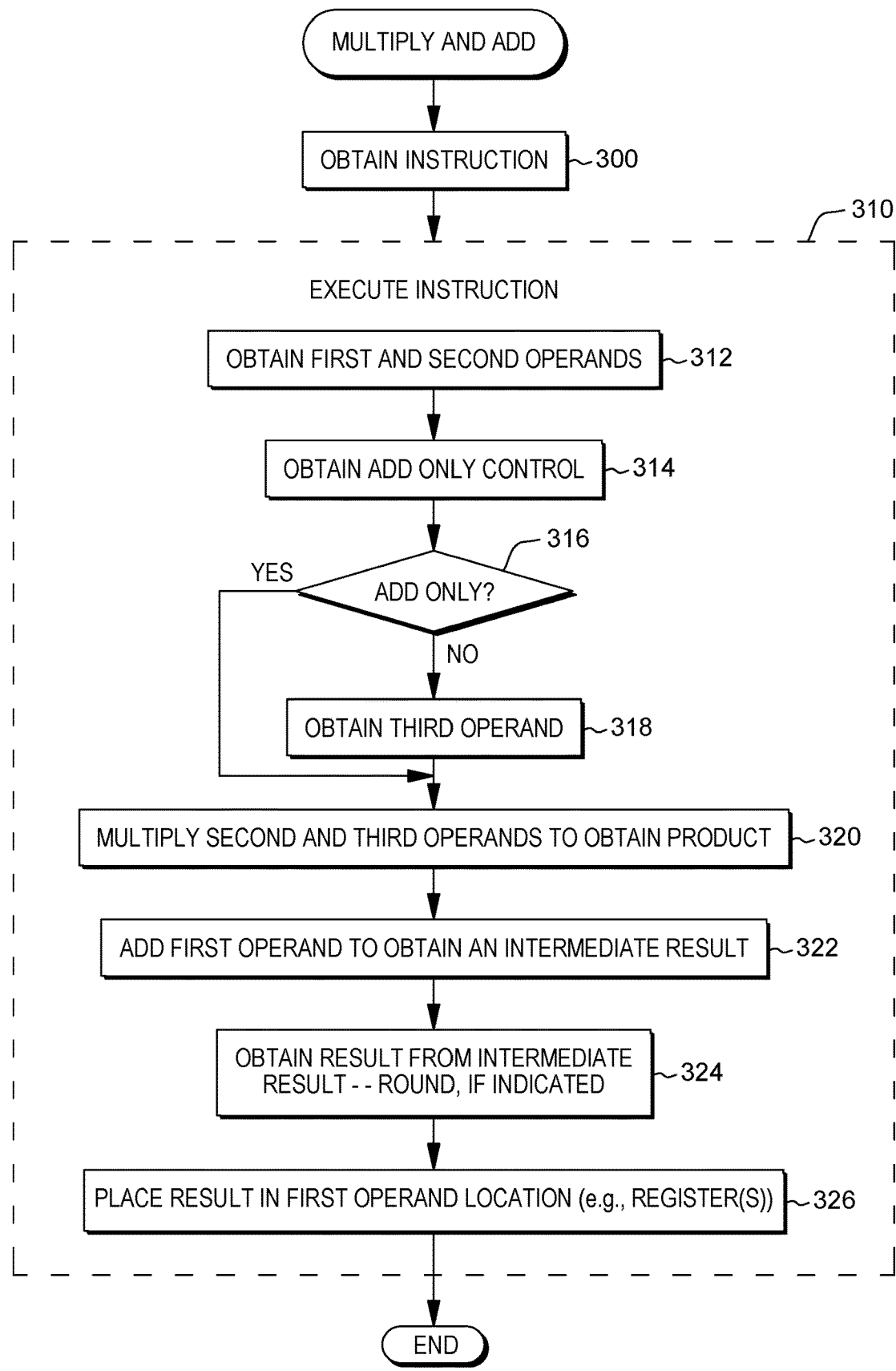
FIG. 3 depicts one example of processing associated with execution of the Multiply and Add instruction, in accordance with one or more aspects of the present invention.
Figure 4:
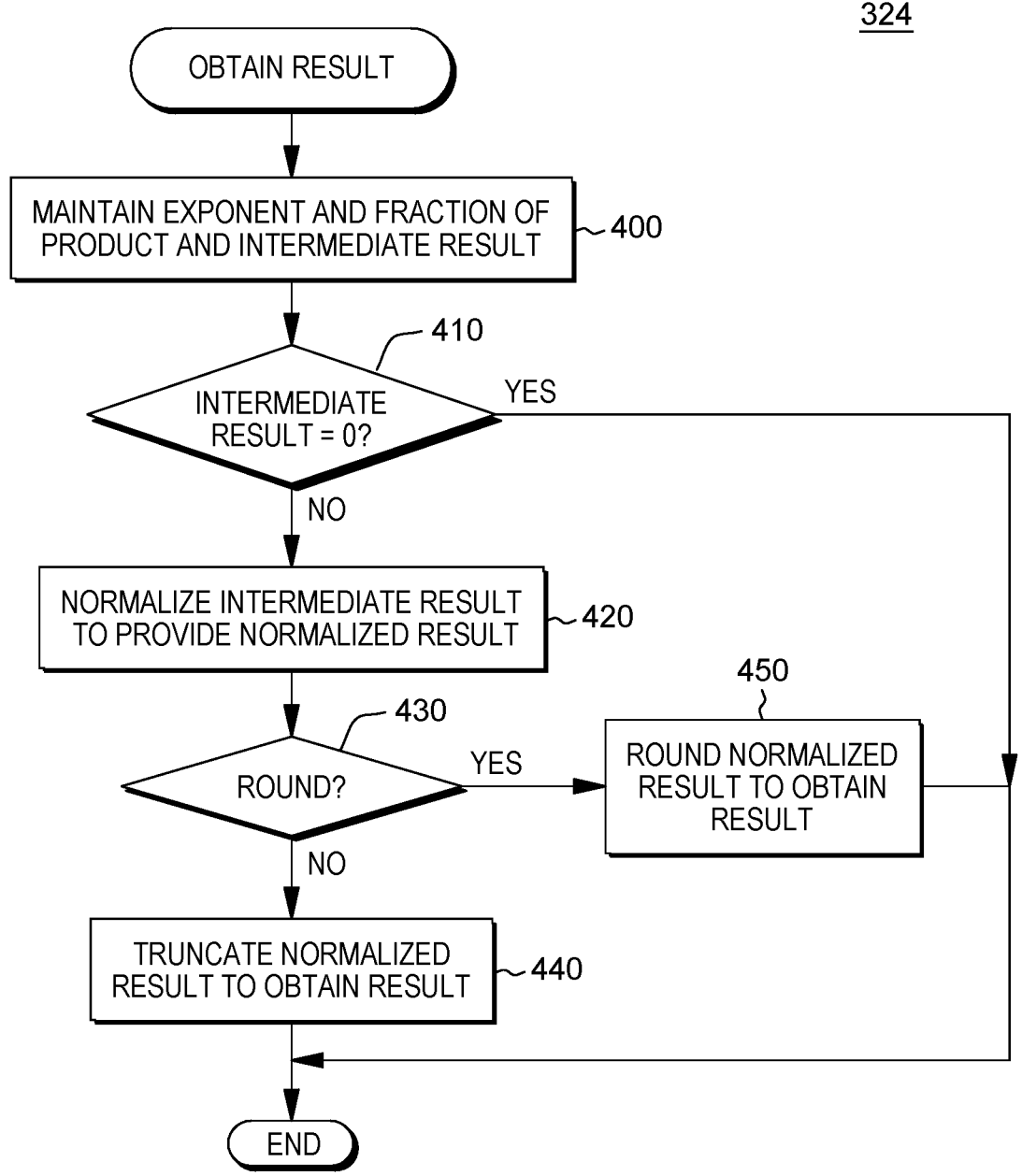
FIG. 4 depicts one example of further details associated with obtaining a result of the Multiply and Add instruction, in accordance with one or more aspects of the present invention.

Referring to FIG. 3, initially, an instruction, such as a Multiply and Add instruction, is obtained (e.g., fetched, received, provided, etc.) 300 and executed 310. In one example, the first and second operands are obtained 312. Further, in one embodiment, a control referred to herein as Add Only control 220 is obtained 314. If the control indicates that a multiply and add operation are to be performed (e.g., Add Only control is set to zero) 316, the third operand is obtained (e.g., the third operand is read from one or more registers specified using $R_3$) 318, and the second and third operands are multiplied to obtain a product 320. Otherwise, if the control indicates that an Add Only operation is to be performed (e.g., Add Only control is set to one) 316, it is assumed that the third operand is a value of 1 and the one or more registers specified by $R_3$ are not read. The second and third operands (e.g., the third operand has a predetermined value of 1 in hexadecimal floating point) are multiplied to obtain a product 320.

The first operand is added to the product to obtain an intermediate result 322. A result is obtained from the intermediate result 324 and the result is placed in the first operand location (e.g., in one or more registers specified using $R_1$) 326. In one example, rounding may be performed to obtain the result, as described herein.

Further details regarding obtaining the result from the intermediate result 324 are described with reference to FIG. 4. In one example, the exponent and fraction of the intermediate product and intermediate result are maintained exactly 400. If the intermediate result is non-zero 410, it is normalized to provide a normalized result 420. Further, a determination is made as to whether rounding is to be performed 430. As an example, this determination is made by checking rounding mode control 222. If rounding is not to be performed, the normalized result is truncated to the operand format providing the result to be placed at the first operand location 440. However, if rounding is to be performed 430, then the normalized result is rounded to, e.g., nearest with ties away from zero to the operand format to obtain the result to be placed at the first operand location 450. In one example, rounding mode is only used for the Add Only operation. In other examples, it may be used in other operations.

Although various fields and registers of the Multiply and Add instruction are described, one or more aspects of the present invention may use other, additional and/or fewer fields and/or registers, and/or other sizes of fields and/or registers, etc. Many variations are possible. For instance, implied registers may be used instead of explicitly specified registers and/or fields of the instruction and/or explicitly specified registers and/or fields may be used instead of implied registers and/or fields. Other variations are also possible.

As described herein, in one aspect, a single instruction (e.g., a single architected machine instruction at the hardware/software interface, e.g., a Multiply and Add instruction) is provided to perform multiply, add, normalizing, truncating and/or rounding operations. This instruction is, for instance, a hardware instruction defined in an instruction set architecture (ISA) that directly performs a Multiply and Add operation and/or an Add Only operation. The complexity of a program related to performing multiply and add operations is reduced. Further, performance of the operations, and thus, the processor, is improved. The hardware instruction execution reduces execution times and improves performance.

By using a single instruction to perform, at least, the multiplying and adding operations (and, optionally, normalizing, truncating and/or rounding; and/or other operations), rather than multiple instructions, performance is improved by not requiring multiple passes through the hardware/software interface. Further, by performing the processing as part of one instruction, the processing remains in the processing unit performing the operations (e.g., a floating point processing unit), not requiring prior to completing the processing, updating of the registers of a register file of the processor (i.e., an array of processor registers used to store data between memory and the functional units, e.g., a floating point processing unit). This improves execution time and reduces use of processor resources.

In accordance with one or more aspects, by performing the arithmetic (e.g., addition) using a multiply instruction which also performs the arithmetic as part of one instruction, accuracy is increased, and by using a single instruction rather than multiple instructions, complexity is reduced, performance is improved, and the use of system resources is reduced. Further, by also providing a rounding mode as part of the one instruction, in one example, the error can be perturbed to be either all in one direction or half the absolute error in both directions. The error of truncation is 0 to +1 ulp but rounding is between −½ ulp to +½ ulp, where ulp represents the weight of a unit in the last place of the operand.

Although in one example herein, the arithmetic operation is addition, in other examples, other arithmetic operations may be performed, including but not limited to subtraction. Many variations are possible.

One or more aspects of the present invention are inextricably tied to computer technology and facilitate processing within a computer, improving performance thereof. The use of a single architected machine instruction to, at least, perform multiply and add operations, and optionally, to perform normalizing, rounding and/or truncating, improves performance within the computing environment by reducing complexity, reducing use of resources and increasing processing speed. Further, the use of a single architected machine instruction to perform a multiply and add (and, in one embodiment, normalize, round and/or truncate the result and/or perform other operations) improves performance within the computing environment by reducing complexity, reducing use of resources and increasing processing speed. The data and/or instruction(s) may be used in many technical fields, such as in computer processing, medical processing, engineering, automotive technologies, manufacturing, etc. By providing optimizations in performing arithmetic operations, these technical fields are improved by reducing execution time.

Further details of an embodiment of facilitating processing within a computing environment, as it relates to one or more aspects of the present invention, are described with reference to FIGS. 5A-5C.

Referring to FIG. 5A, in one embodiment, an instruction to perform an operation selected from a plurality of operations configured for the instruction is executed 500. In one example, the executing the instruction includes determining a value of a selected operand of the instruction (e.g., the third operand) 502. The determining the value of the selected operand is based on a control of the instruction 504 and includes, for instance, reading the selected operand of the instruction from a selected operand location to obtain the value of the selected operand, based on the control of the instruction having a first value 506, and using a predetermined value as the value of the selected operand, based on the control of the instruction having a second value 508. The value and another selected operand of the instruction (e.g., the second operand) are multiplied to obtain a product 510. An arithmetic operation is performed using the product and a chosen operand of the instruction (e.g., the first operand) to obtain an intermediate result 512. A result is obtained from the intermediate result 514 and placed in a selected location 516.

By using a single instruction to perform the multiplying and arithmetic operations, performance is improved, and utilization of resources is reduced. By using a single architected instruction to perform the multiplying and arithmetic operations, certain tasks may be performed, such as the multiplying and arithmetic operations, much more efficiently than using a software paradigm. The multiplying and/or arithmetic operations are performed much faster, reducing execution time, and improving processor and/or overall system performance.

By using a single instruction configured to perform multiple operations, performance is improved, and utilization of resources is reduced. By using a single architected instruction configured to perform a multiply and arithmetic operation or an arithmetic only operation in which the multiplication is performed to provide a greater accuracy for the arithmetic operation, certain tasks may be performed, such as the multiply and arithmetic operations, much more efficiently than using a software paradigm. The multiply and arithmetic operations are performed much faster, reducing execution time, and improving processor and/or overall system performance.

Further, in one example, by performing the arithmetic (e.g., addition) using a multiply instruction which also performs the arithmetic, accuracy is increased, and by using a single instruction rather than multiple instructions, complexity is reduced, performance is improved, and the use of system resources is reduced. For instance, multiplication of two operands results in a product of twice the width and by combining arithmetic operations in a single instruction, the full double width product can participate in the arithmetic rather than a rounded or truncated product. As an example, the multiplication of two 6 hex digit operands results in a 12 hex digit product. If they were separate operations, the product would be truncated to 6 hex digits prior to the next operation. By using the full intermediate result, the combined operation is more accurate. Stated another way, for floating point simple operations with truncation, typically a 0 to 1 unit of last place (ulp) of error is obtained. If there is a multiply and truncate, the product has a 1 ulp of error, and then if there is an add of the product to an addend, that results in another 1 ulp of error for a total of 2 ulps of error. However, if it is one compound operation, there is only 1 ulp of error. This is true for binary floating point and for hexadecimal floating point, it is even worse.

In one example, the using the predetermined value as the value of the selected operand includes using the predetermined value absent reading the selected operand from the selected operand location (e.g., at least one register) 518. This improves system performance by eliminating a read of one or more registers.

As an example, referring to FIG. 5B, the predetermined value includes a value of one 520.

In one example, the executing the instruction further includes determining whether a rounding operation is to be performed 522 and based on determining that the rounding operation is to be performed, performing the rounding operation on a version of the intermediate result to obtain the result 524. The version of the intermediate result includes, for instance, a normalized result 526.

By using a single instruction to perform the multiplying, arithmetic, rounding and/or normalizing operations, performance is improved, and utilization of resources is reduced. By using a single architected instruction to perform the multiplying, arithmetic, rounding and/or normalizing operations, certain tasks may be performed, such as the multiplying, arithmetic, rounding and/or normalizing operations, much more efficiently than using a software paradigm. The multiplying, arithmetic, rounding and/or normalizing operations, are performed much faster, reducing execution time, and improving processor and/or overall system performance.

In one example, the determining whether the rounding operation is to be performed includes checking a rounding mode control of the instruction 528 and based on the rounding mode control being equal to one value, the rounding operation is to be performed 530. Further, in one embodiment, by including a rounding mode control as part of the single instruction, direction and magnitude of an error may be controlled. In one example, the error can be perturbed to be either all in one direction or half the absolute error in both directions. The error of truncation is 0 to +1 ulp but rounding is between −½ ulp to +½ ulp.

In one example, the obtaining the result includes normalizing the intermediate result to obtain a normalized result 532 and using the normalized result to obtain the result 534.

Further, referring to FIG. 5C, in one example, the using the normalized result to obtain the result includes determining whether a rounding operation is to be performed 540, and based on determining that the rounding operation is to be performed, rounding the normalized result to obtain the result 542. Further, in one example, based on determining that the rounding operation is not to be performed, truncating the normalized result to obtain the result 544.

By using a single instruction to perform the multiplying, arithmetic, normalizing, rounding and/or truncating operations, performance is improved, and utilization of resources is reduced. By using a single architected instruction to perform the multiplying, arithmetic, normalizing, rounding and/or truncating operations, certain tasks may be performed, such as the multiplying, arithmetic, normalizing, rounding and/or truncating operations, much more efficiently than using a software paradigm. The multiplying, arithmetic, normalizing, rounding and/or truncating operations, are performed much faster, reducing execution time, and improving processor and/or overall system performance.

As an example, the selected location includes at least one register specified by at least one field of the instruction 546.

In one example, the control is an Add Only control and the arithmetic operation includes an add operation 548. Based on the control having the second value, the control indicates that the instruction is to perform an Add Only operation in that the other selected operand is multiplied by the predetermined value of one 550. Further, based on the control having the first value, the control indicates that the instruction is to perform a multiply and add operation and that the other selected operand is multiplied by the value read from the selected operand location 552.

By using a single instruction to perform the multiplying and adding operations, performance is improved, and utilization of resources is reduced. By using a single architected instruction to perform the multiplying and adding operations, certain tasks may be performed, such as the multiplying and adding operations, much more efficiently than using a software paradigm. The multiplying and adding operations, are performed much faster, reducing execution time, and improving processor and/or overall system performance.

By using a single instruction configured to perform multiple operations, performance is improved, and utilization of resources is reduced. By using a single architected instruction configured to perform a Multiply and Add operation and/or an Add Only operation in which the multiplication is performed to provide a greater accuracy for the add operation but otherwise does not affect the summation, certain tasks may be performed, such as the multiply and add operations, much more efficiently than using a software paradigm. The multiply and add operations are performed much faster, reducing execution time, and improving processor and/or overall system performance.

Further, in one example, by performing the arithmetic (e.g., addition) using a multiply instruction which also performs the arithmetic in the single instruction, accuracy is increased, and by using a single instruction rather than multiple instructions, complexity is reduced, performance is improved, and the use of system resources is reduced.

Other variations and embodiments are possible.

Figure 6A:
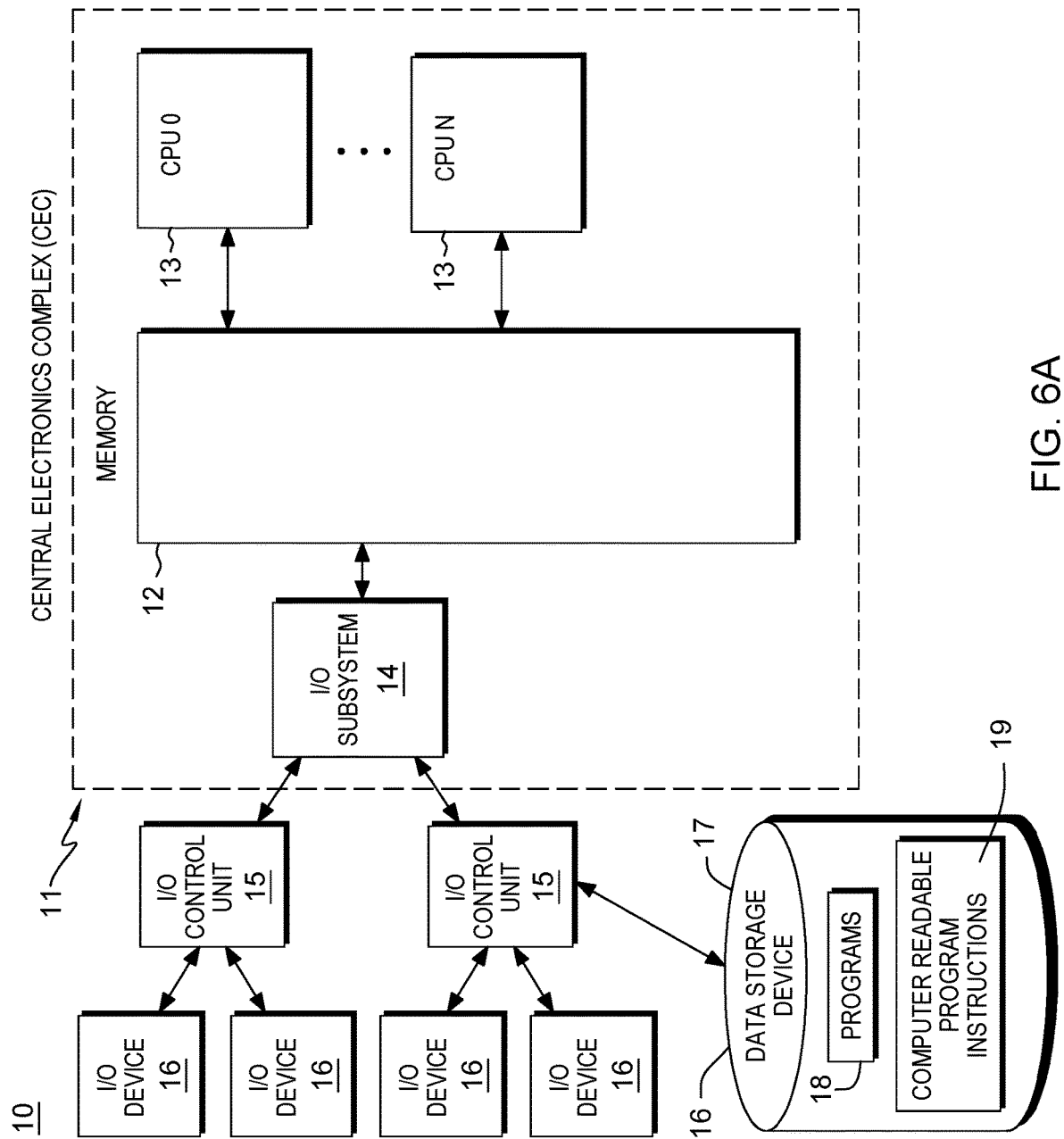
FIG. 6A depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 6A. As an example, the computing environment of FIG. 6A is based on the z/Architecture® hardware architecture offered by International Business Machines Corporation, Armonk, N.Y. The z/Architecture hardware architecture, however, is only one example architecture. Again, the computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors (a.k.a., central processing units (CPUs)) 13 and to an input/output (I/O) subsystem 14.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6C:
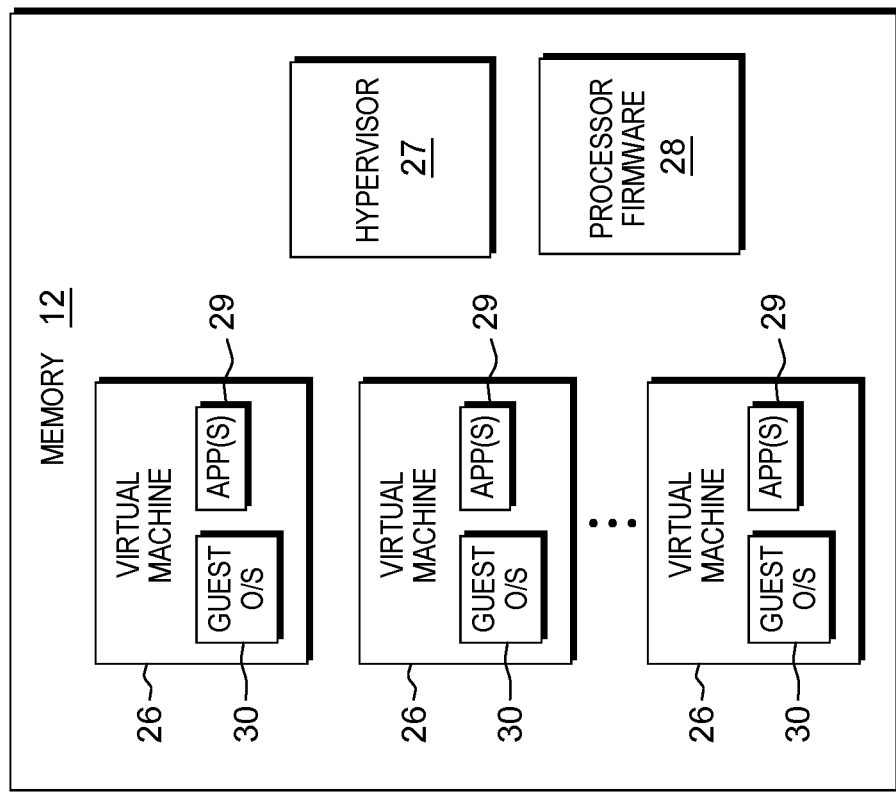
FIG. 6C depicts another example of further details of a memory of FIG. 6A, in accordance with one or more aspects of the present invention.
Figure 6B:
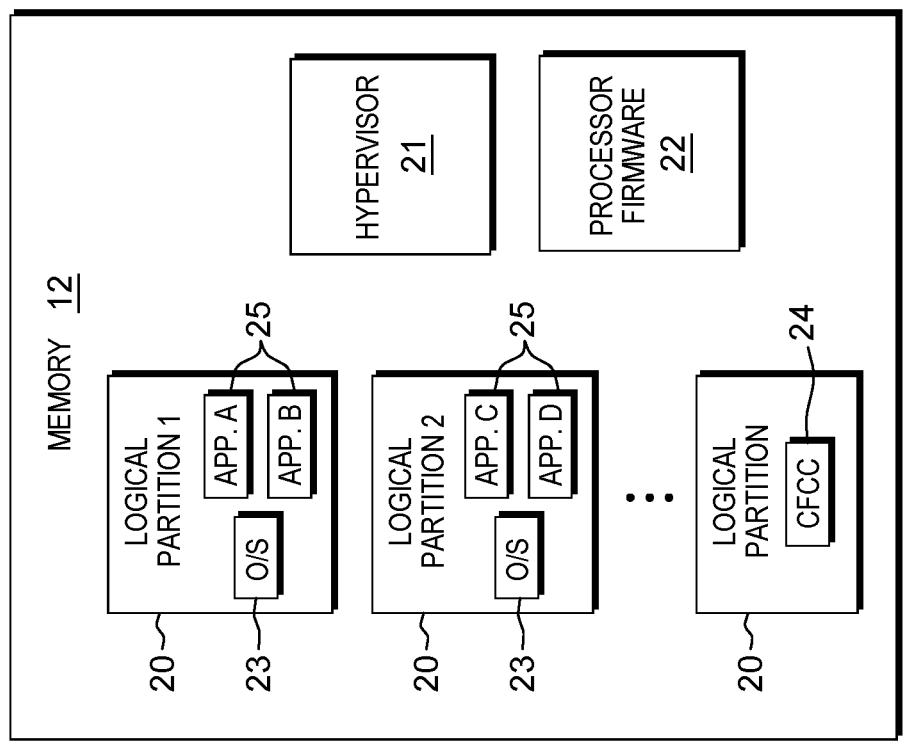
FIG. 6B depicts one example of further details of a memory of FIG. 6A, in accordance with one or more aspects of the present invention.

Central electronics complex 11 provides in one or more embodiments logical partitioning and/or virtualization support. In one embodiment, as shown in FIG. 6B, memory 12 includes, for example, one or more logical partitions 20, a hypervisor 21 that manages the logical partitions, and processor firmware 22. One example of hypervisor 21 is the Processor Resource/System Manager (PR/SM'), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. PR/SM is a trademark or registered trademark of International Business Machines Corporation in at least one jurisdiction.

Each logical partition 20 is capable of functioning as a separate system. That is, each logical partition can be independently reset, run a guest operating system 23 such as the z/OS® operating system, offered by International Business Machines Corporation, Armonk, N.Y., or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to CPUs 13 (FIG. 6A), which are physical processor resources that can be allocated to the logical partitions. For instance, a logical partition 20 includes one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 6C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 7A:
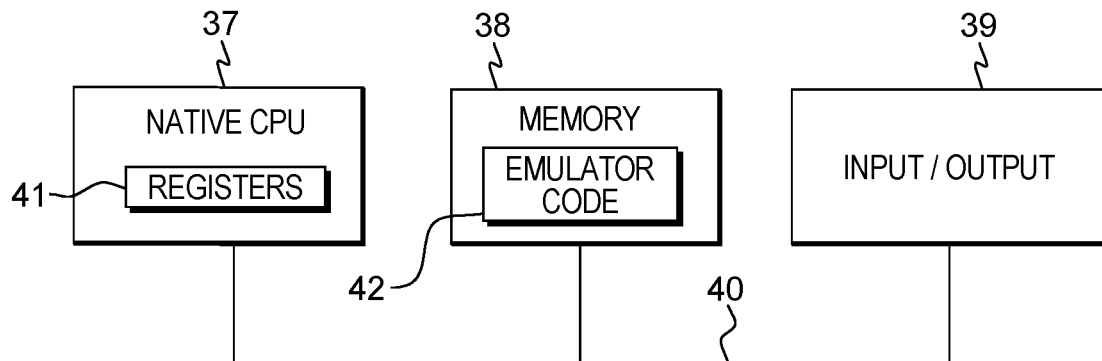
FIG. 7A depicts yet another example of a computing environment to incorporate and use one or more aspects of the present invention.

Another embodiment of a computing environment to incorporate and use one or more aspects of the present invention is described with reference to FIG. 7A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
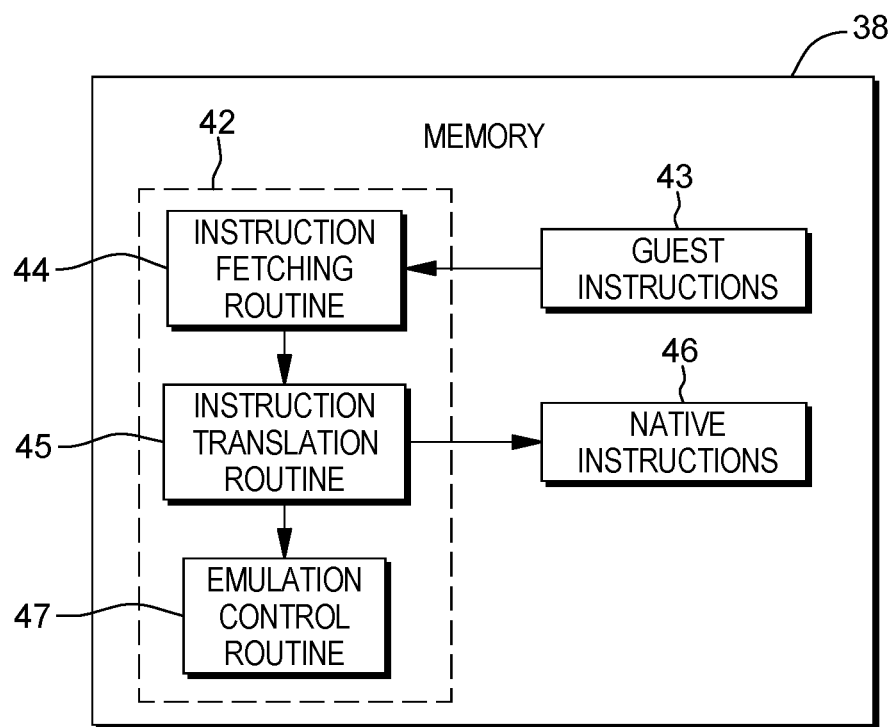
FIG. 7B depicts further details of the memory of FIG. 7A, in accordance with one or more aspects of the present invention.

Further details relating to emulator code 42 are described with reference to FIG. 7B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An example instruction that may be emulated is the Multiply and Add instruction described herein, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
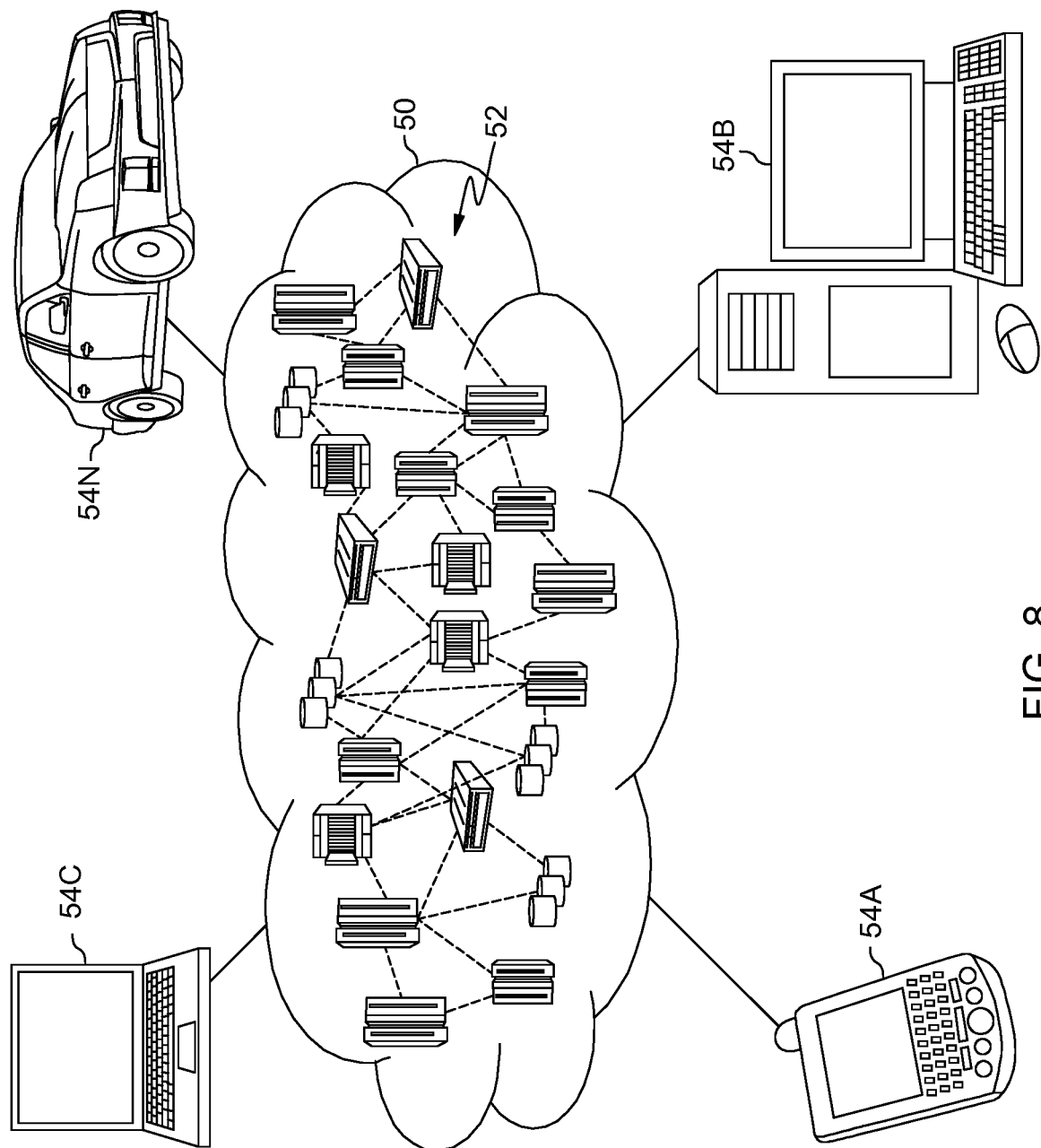
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
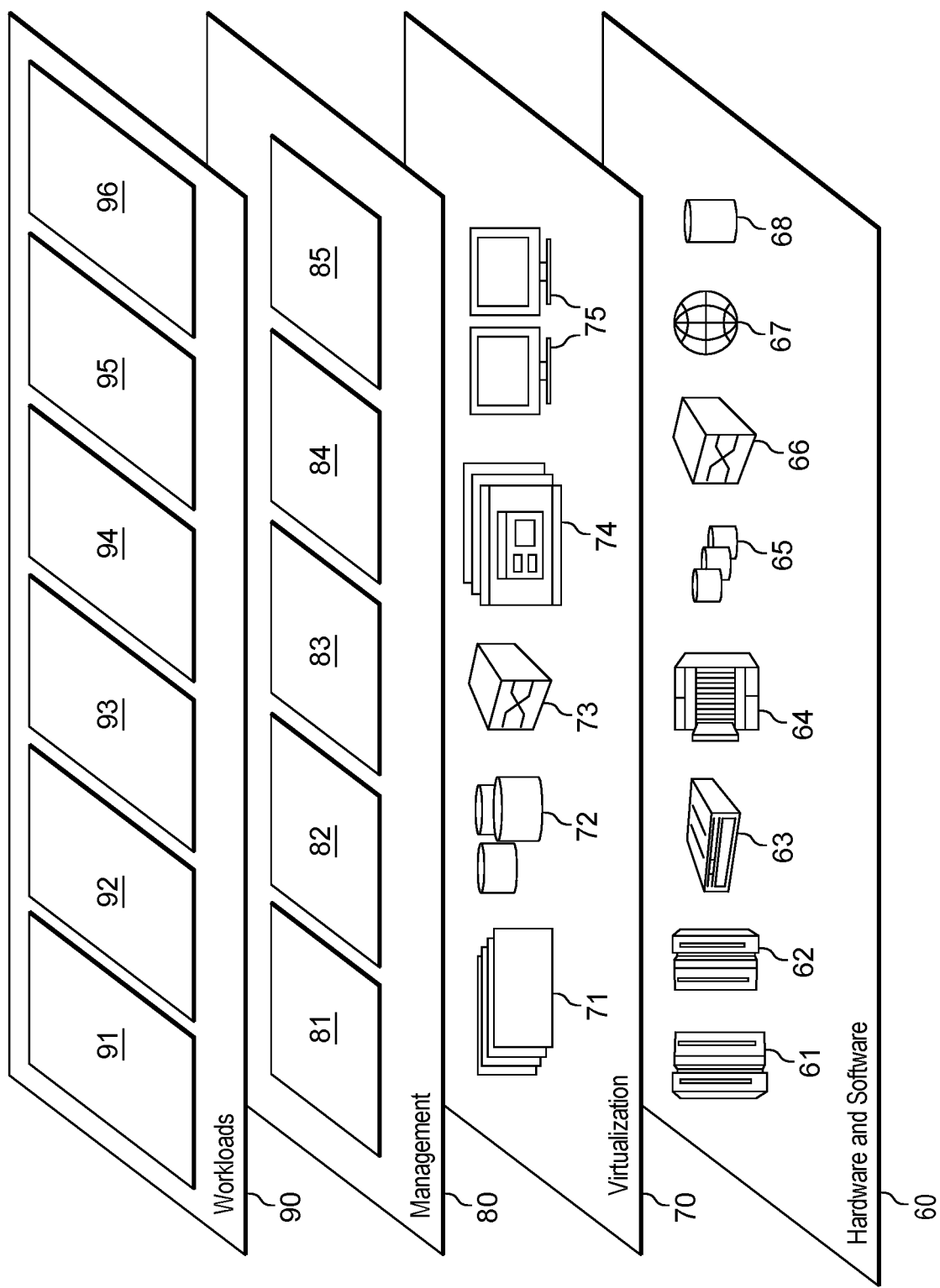
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multiply and add (and/or normalize and/or round and/or truncate processing) 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:
      executing an instruction to perform an operation selected from a plurality of operations configured for the instruction, the instruction including an operation code field indicating an operation to be performed and a field separate from the operation code field used to specify a control to be used in execution of the instruction, and wherein the executing the instruction comprises:

determining a value of a selected operand of the instruction, wherein the determining the value of the selected operand of the instruction is based on the control specified using the field of the instruction, wherein the control is set to one control value of multiple control values configured for the control, the multiple control values including a first value and a second value, and wherein the determining the value of the selected operand of the instruction comprises:

reading the selected operand of the instruction from a selected operand location to obtain the value of the selected operand, based on the control of the instruction having the first value; and using a predetermined value as the value of the selected operand, based on the control of the instruction having the second value;

multiplying the value and another selected operand of the instruction to obtain a product;

performing an arithmetic operation using the product and a chosen operand of the instruction to obtain an intermediate result;

obtaining a result from the intermediate result; and placing the result in a selected location.

2. The computer program product of claim 1, wherein the using the predetermined value as the value of the selected operand comprises using the predetermined value absent reading the selected operand from the selected operand location, the selected operand location comprising at least one register.

3. The computer program product of claim 1, wherein the predetermined value comprises a value of one.

4. The computer program product of claim 1, wherein the executing the instruction further comprises:

determining whether a rounding operation is to be performed; and performing the rounding operation on a version of the intermediate result to obtain the result, based on determining that the rounding operation is to be performed.

5. The computer program product of claim 4, wherein the version of the intermediate result comprises a normalized result.

6. The computer program product of claim 4, wherein the determining whether the rounding operation is to be performed comprises checking a rounding mode control of the instruction, wherein based on the rounding mode control being equal to one value, the rounding operation is to be performed.

7. The computer program product of claim 1, wherein the obtaining the result comprises:

normalizing the intermediate result to obtain a normalized result; and using the normalized result to obtain the result.

8. The computer program product of claim 7, wherein the using the normalized result to obtain the result comprises:

determining whether a rounding operation is to be performed;

rounding the normalized result, based on determining that the rounding operation is to be performed, to obtain the result; and truncating the normalized result, based on determining that the rounding operation is not to be performed, to obtain the result.

9. The computer program product of claim 1, wherein the selected location comprises at least one register specified by at least one field of the instruction.

10. The computer program product of claim 1, wherein the arithmetic operation comprises an add operation, and based on the control having the second value, the control indicates that the instruction is to perform an operation in that the other selected operand is multiplied by the predetermined value of one, and based on the control having the first value, the control indicates that the instruction is to perform a multiply and add operation and that the other selected operand is multiplied by the value read from the selected operand location.

11. The computer program product of claim 1, wherein the executing the instruction further includes determining the one control value to which the control is set and performing the determining the value of the selected operand based on determining the one control value.

12. The computer program product of claim 1, wherein the control set to the first value indicates the operation selected from the plurality of operations to be performed includes a multiplication using a multiplier read from the selected operand location and the arithmetic operation, and wherein the control set to the second value indicates another operation selected from the plurality of operations is to be performed that includes multiplication of the predetermined value and the arithmetic operation.

13. The computer program product of claim 12, wherein the predetermined value is a value of one in a particular format.

14. The computer program product of claim 13, wherein the particular format is a hexadecimal floating point format.

15. A computer system for facilitating processing within a computing environment, the computer system comprising:

a memory; and a processor in communication with the memory, wherein the computer system is configured to perform a method, said method comprising:

executing an instruction to perform an operation selected from a plurality of operations configured for the instruction, the instruction including an operation code field indicating an operation to be performed and a field separate from the operation code field used to specify a control to be used in execution of the instruction, and wherein the executing the instruction comprises:

determining a value of a selected operand of the instruction, wherein the determining the value of the selected operand of the instruction is based on the control specified using the field of the instruction, wherein the control is set to one control value of multiple control values configured for the control, the multiple control values including a first value and a second value, and wherein the determining the value of the selected operand of the instruction comprises:

reading the selected operand of the instruction from a selected operand location to obtain the value of the selected operand, based on the control of the instruction having the first value; and using a predetermined value as the value of the selected operand, based on the control of the instruction having the second value;

multiplying the value and another selected operand of the instruction to obtain a product;

performing an arithmetic operation using the product and a chosen operand of the instruction to obtain an intermediate result;

obtaining a result from the intermediate result; and placing the result in a selected location.

16. The computer system of claim 15, wherein the using the predetermined value as the value of the selected operand comprises using the predetermined value absent reading the selected operand from the selected operand location, the selected operand location comprising at least one register, and wherein the predetermined value comprises a value of one.

17. The computer system of claim 15, wherein the executing the instruction further comprises:

determining whether a rounding operation is to be performed; and performing the rounding operation on a version of the intermediate result to obtain the result, based on determining that the rounding operation is to be performed.

18. The computer system of claim 17, wherein the determining whether the rounding operation is to be performed comprises checking a rounding mode control of the instruction, wherein based on the rounding mode control being equal to one value, the rounding operation is to be performed.

19. The computer system of claim 15, wherein the obtaining the result comprises:

normalizing the intermediate result to obtain a normalized result; and using the normalized result to obtain the result.

20. A computer-implemented method of facilitating processing within a computing environment, the computer-implemented method comprising:

executing an instruction to perform an operation selected from a plurality of operations configured for the instruction, the instruction including an operation code field indicating an operation to be performed and a field separate from the operation code field used to specify a control to be used in execution of the instruction, and wherein the executing the instruction comprises:

determining a value of a selected operand of the instruction, wherein the determining the value of the selected operand of the instruction is based on the control specified using the field of the instruction, wherein the control is set to one control value of multiple control values configured for the control, the multiple control values including a first value and a second value, and wherein the determining the value of the selected operand of the instruction comprises:

reading the selected operand of the instruction from a selected operand location to obtain the value of the selected operand, based on the control of the instruction having the first value; and using a predetermined value as the value of the selected operand, based on the control of the instruction having the second value;

multiplying the value and another selected operand of the instruction to obtain a product;

performing an arithmetic operation using the product and a chosen operand of the instruction to obtain an intermediate result;

obtaining a result from the intermediate result; and placing the result in a selected location.

21. The computer-implemented method of claim 16, wherein the using the predetermined value as the value of the selected operand comprises using the predetermined value absent reading the selected operand from the selected operand location, the selected operand location comprising at least one register, and wherein the predetermined value comprises a value of one.

22. The computer-implemented method of claim 16, wherein the executing the instruction further comprises:

determining whether a rounding operation is to be performed; and performing the rounding operation on a version of the intermediate result to obtain the result, based on determining that the rounding operation is to be performed.

23. The computer-implemented method of claim 22, wherein the determining whether the rounding operation is to be performed comprises checking a rounding mode control of the instruction, wherein based on the rounding mode control being equal to one value, the rounding operation is to be performed.

24. The computer-implemented method of claim 20, wherein the obtaining the result comprises:

normalizing the intermediate result to obtain a normalized result; and using the normalized result to obtain the result.

25. The computer-implemented method of claim 20, wherein the executing the instruction further includes determining the one control value to which the control is set and performing the determining the value of the selected operand based on determining the one control value.

* * * * *